United States Patent
Michaud

(10) Patent No.: US 11,875,152 B2
(45) Date of Patent: Jan. 16, 2024

(54) METHODS AND SYSTEMS FOR OPTIMIZING FILE SYSTEM USAGE

(71) Applicant: EMC IP Holding Company LLC, Hopkinton, MA (US)

(72) Inventor: Adrian Michaud, Carlisle, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 235 days.

(21) Appl. No.: 17/086,292

(22) Filed: Oct. 30, 2020

(65) Prior Publication Data

US 2022/0137964 A1 May 5, 2022

(51) Int. Cl.
| | |
|---|---|
| *G06F 9/30* | (2018.01) |
| *G06F 9/50* | (2006.01) |
| *G06F 9/54* | (2006.01) |
| *G06F 12/1045* | (2016.01) |
| *G06F 12/1009* | (2016.01) |

(52) U.S. Cl.
CPC ........ *G06F 9/3009* (2013.01); *G06F 9/30047* (2013.01); *G06F 9/5016* (2013.01); *G06F 9/544* (2013.01); *G06F 9/545* (2013.01); *G06F 9/546* (2013.01); *G06F 12/1009* (2013.01); *G06F 12/1063* (2013.01); *G06F 9/5027* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 8,180,973 B1* | 5/2012 | Armangau | G06F 9/5033 |
| | | | 711/158 |
| 10,210,092 B1* | 2/2019 | Miao | G06F 13/4068 |
| 10,606,750 B1* | 3/2020 | Mattina | G06F 12/122 |
| 2009/0260013 A1* | 10/2009 | Heil | G06F 9/3851 |
| | | | 718/103 |
| 2012/0174117 A1* | 7/2012 | Jula | G06F 9/5088 |
| | | | 718/105 |
| 2013/0290583 A1* | 10/2013 | Dice | G06F 9/526 |
| | | | 710/200 |
| 2016/0077867 A1* | 3/2016 | Falco | G06F 9/546 |
| | | | 718/101 |
| 2016/0378545 A1* | 12/2016 | Ho | G06F 9/4812 |
| | | | 718/107 |
| 2017/0168952 A1* | 6/2017 | Zhu | G06F 12/00 |
| 2018/0101409 A1* | 4/2018 | Mealey | G06F 9/5038 |
| 2019/0050321 A1* | 2/2019 | Sapozhnikov | G06F 11/3672 |
| 2020/0004607 A1* | 1/2020 | Mahajani | H04L 47/6275 |
| 2020/0341811 A1* | 10/2020 | Rostykus | G06F 9/5033 |
| 2021/0109795 A1* | 4/2021 | Colombo | G06F 9/4881 |
| 2021/0377345 A1* | 12/2021 | Li | H04L 69/163 |
| 2021/0397492 A1* | 12/2021 | Li | G06F 9/546 |

* cited by examiner

*Primary Examiner* — Abu Zar Ghaffari
(74) *Attorney, Agent, or Firm* — Chamberlain, Hrdlicka, White, Williams & Aughtry; Aly Z. Dossa

(57) ABSTRACT

A method for generating a thread queue, that includes obtaining, by a user space file system, central processing unit (CPU) socket data, and based on the CPU socket data, generating a plurality of thread handles for a plurality of cores, ordering the plurality of thread handles, in the thread queue, for a first core of the plurality of cores, and saving the thread queue to a region of shared memory.

18 Claims, 11 Drawing Sheets

METHODS AND SYSTEMS FOR OPTIMIZING FILE SYSTEM USAGE

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for generating a thread queue, that includes obtaining, by a user space file system, central processing unit (CPU) socket data, and based on the CPU socket data, generating a plurality of thread handles for a plurality of cores, ordering the plurality of thread handles, in the thread queue, for a first core of the plurality of cores, and saving the thread queue to a region of shared memory.

In general, in one aspect, embodiments relate to a non-transitory computer readable medium that includes instructions which, when executed by a computer processor, enables the computer processor to perform a method for generating a thread queue, that includes obtaining, by a user space file system, CPU socket data, and based on the CPU socket data, generating a plurality of thread handles for a plurality of cores, ordering the plurality of thread handles, in the thread queue, for a first core of the plurality of cores, and saving the thread queue to a region of shared memory.

In general, in one aspect, embodiments relate to a node, that includes user space file system, an application, memory, a plurality of cores, and a processor, where the processor is configured to perform a method for generating a thread queue, that includes obtaining, by the user space file system, CPU socket data, and based on the CPU socket data, generating a plurality of thread handles for a plurality of cores, ordering the plurality of thread handles, in the thread queue, for a first core of the plurality of cores, and saving the thread queue to a region of the memory, where the region of memory is shared by the application and the user space file system.

Other aspects of the invention will be apparent from the following description and the appended claims.

DETAILED DESCRIPTION

Figure 1:
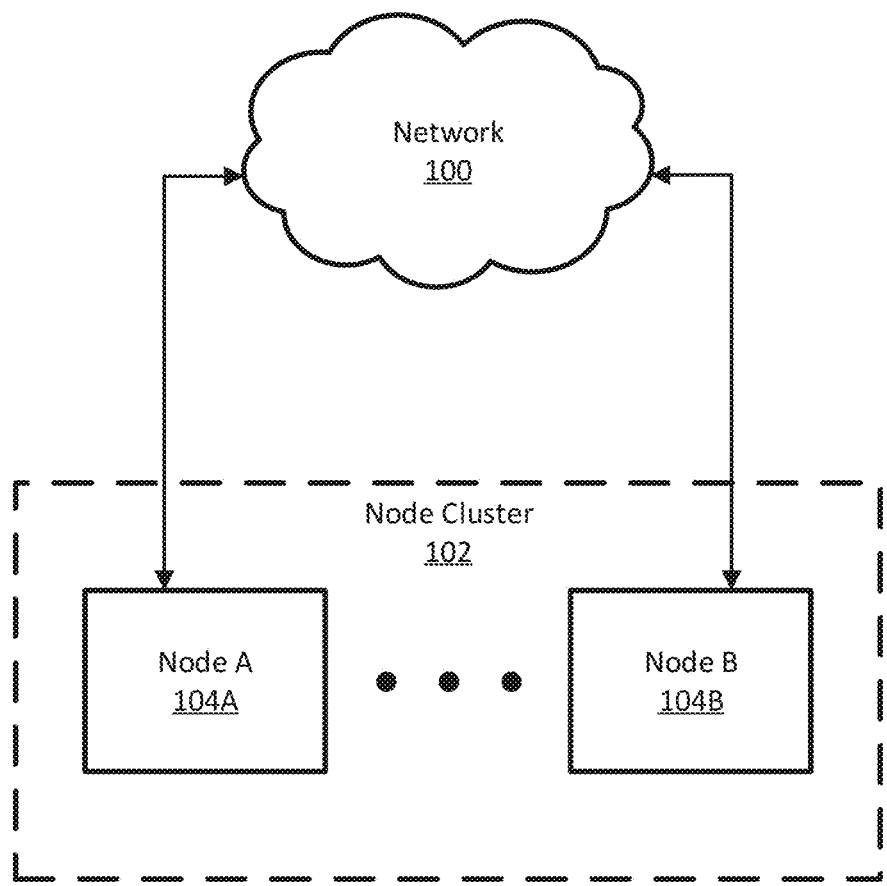
FIG. 1 shows a diagram of system, in accordance with one or more embodiments of the invention.

In general, embodiments of the invention relate to systems and methods for generating thread queues and efficiently serving files from a user space file system using those thread queues. In one or more embodiments disclosed herein, systems and methods are disclosed that provide reduced latency and high bandwidth communications between user space and operating system applications. In one or more embodiments of the invention, pre-defined priority thread queues are generated for each processor core in a system. Thus, when executing a process, an efficient and reduced latency core may be found quickly and utilized without additional overhead computation.

Another embodiment of the invention relates to a user space file system using a virtual memory address space that is dynamically mapped to the same physical memory regions as an application's virtual address space. Accordingly, the user space file system may copy data directly from persistent storage to the application's virtual memory. Thus, there is no need to use a "bounce buffer" as an intermediary location to copy data before serving to an application. Instead, the user space file system may directly access the physical memory the application is manipulating.

Further, in one or more other embodiments, to facilitate communications between a user space file system and a file system kernel module, a fixed shared mapping to the same memory regions allows for rapid exchange of data and commands to serve data.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

FIG. 1 shows a diagram of system, in accordance with one or more embodiments of the invention. The system may include a network (e.g., network (100)) and a (e.g., node cluster (102)) which includes two or more nodes (e.g., node A (104A), node B (104B), etc.). Each of these components is described below.

In one or more embodiments of the invention, a network (e.g., network (100)) is a collection of connected network devices (not shown) that allow for the communication of data from one network device (not shown) to other network devices (not shown), or the sharing of resources among network devices (not shown). Examples of a network (e.g., network (100)) include, but are not limited to, a local area network (LAN), a wide area network (WAN) (e.g., the Internet), a mobile network, or any other type of network that allows for the communication of data and sharing of resources among network devices and/or devices operatively connected to the network (100) (e.g., node A (104A) and node B (104B)). One of ordinary skill in the art, having the benefit of this detailed description, would appreciate that a network (e.g., network (100)) is collection of operatively connected devices that enables communication between those devices.

In one or more embodiments of the invention, a node cluster (102) is a collection of two or more operatively connected node(s) (104A, 104B). Node(s) (104A, 104B) of a cluster (102) may be operatively connected via a network (e.g., network (100)). In one or more embodiments of the invention, a node (e.g., node A (104A), node B (104B)) is a computing device (not shown). In one or more embodiments of the invention, a computing device includes one or more processor(s), memory, and persistent storage. The persistent storage (and/or memory) may store computer instructions (e.g., computer code) which, when executed by the processor(s) of the computing device, cause the computing device to issue one or more requests and to receive one or more responses. Non-limiting examples of a computing device include a mobile phone, tablet computer, laptop computer, desktop computer, server, distributed computing system, or cloud resource. Additional details regarding node(s) (104A, 104B) may be found in the discussion of FIG. 2.

While FIG. 1 shows a specific configuration of a system, other configurations may be used without departing from the scope of the invention. For example, although only two nodes are shown in FIG. 1, the node cluster may include any positive integer number of nodes (e.g., 3, 4, 5, etc.). Accordingly, embodiments disclosed herein should not be limited to the configuration of devices and/or components shown in FIG. 1.

Figure 2:
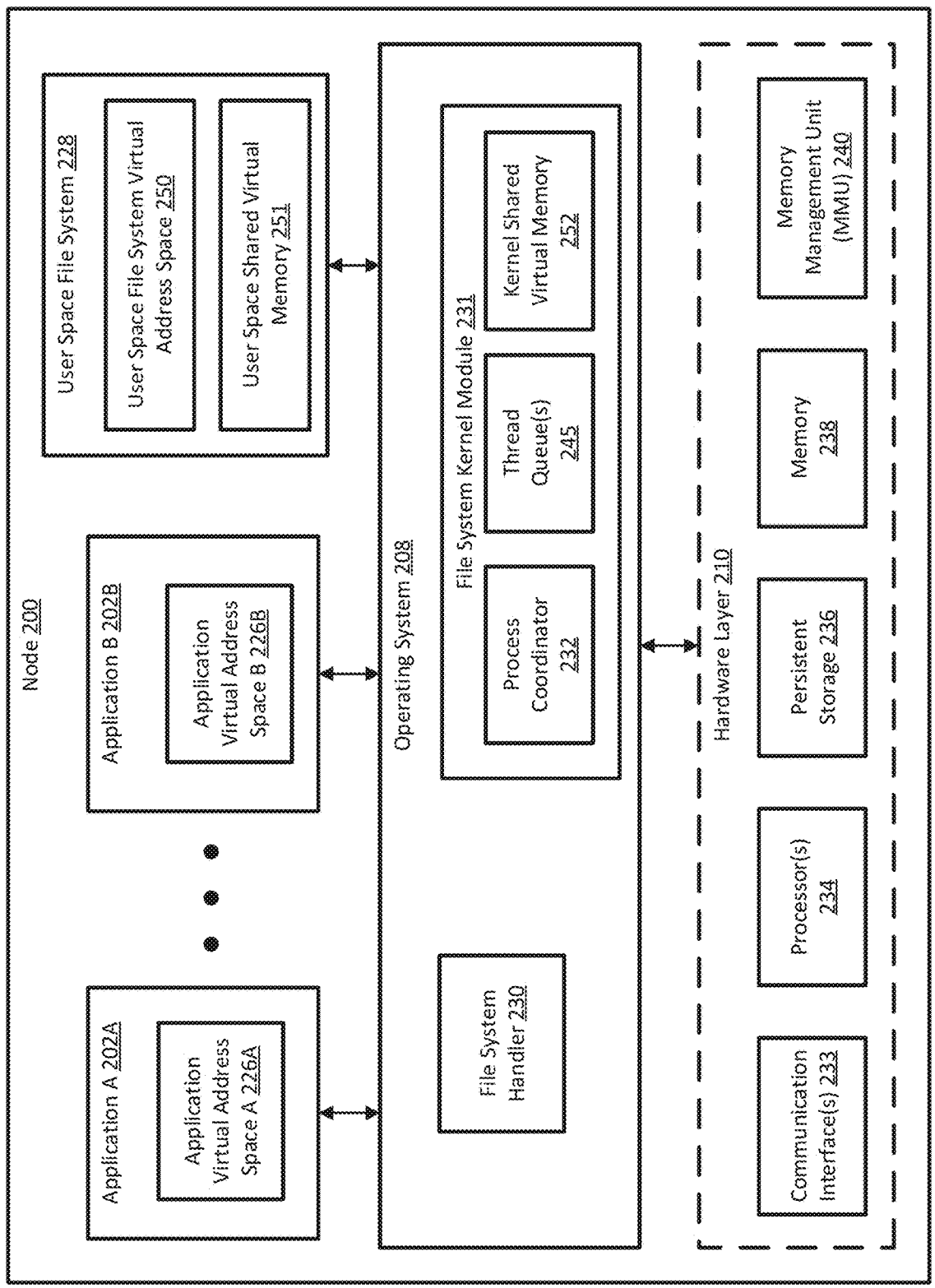
FIG. 2 shows a diagram of a node, in accordance with one or more embodiments of the invention.

FIG. 2 shows a diagram of a node (200) in accordance with one or more embodiments of the invention. In one embodiment of the invention, node (200) includes one or more applications (e.g., application A (202A), application B (202B)), a user space file system (228), an operating system (OS) (208), and a hardware layer (210). Each of these components is described below.

In one or more embodiments of the invention, an application (e.g., application A (202A), application B (202B)) includes application virtual address space (e.g., application virtual address space A (226A), application virtual address space B (226B)). In one embodiment of the invention, application virtual address space (226A, 226B) is a simulated range of addresses (e.g., identifiable locations) that mimics the physical locations of one or more components of the hardware layer (210). In one embodiment, an application (202A, 202B) is not configured to identify the physical addresses of one or more components of the hardware layer (210); rather, the application (202A, 202B) relies on other components of the node (200) to translate one or more virtual addresses of application virtual address space (e.g., 226A, 226B) to one or more physical addresses of one or more components of the hardware layer (210). Accordingly, in one or more embodiments of the invention, an application may utilize application virtual address space (226A, 226B) to read, write, and/or otherwise manipulate data, without being configured to directly identify the physical address of that data within the components of the hardware layer (210). In one embodiment of the invention, applications (202A, 202B) may be executing in "user space" (e.g., a layer of the software that utilizes low-level system components for the execution of applications) of the node (200).

Additionally, in one or more embodiments of the invention, an application (e.g., 202A, 202B) may coordinate with other components of the node (200) to establish a mapping between application virtual address space (e.g., 226A, 226B) and underlying physical components of the hardware layer (210). In one embodiment, if a mapping is established, an application's use of the application virtual address space (e.g., 226A, 226B) enables the application to directly manipulate data of those physical components, without relying on other components of the node (200) to repeatedly update mappings between the application virtual address space (e.g., 226A, 226B) and the physical addresses of one or more components of the hardware layer (210).

In one or more embodiments of the invention, a user space file system (e.g., user space file system (228)) is software executing on the node (200). In one or more embodiments of the invention, user space file system (228) is configured to interact (e.g., exchange data) with a file system kernel module (e.g., file system kernel module (230)) and may access one or more hardware layer (210) components (e.g., persistent storage (236), memory (238)) in order to provide data stored thereon to an application (e.g., 202A, 202B). In one embodiment of the invention, user space file system (228) may be executing in "user space" (e.g., a layer of the software that utilizes low-level system components for the execution of applications) of the node (200). Further, user space file system (228) may include a user space file system virtual address space (250) and user space shared virtual memory (251).

In one or more embodiments of the invention, user space file system virtual address space (250) is similar to application virtual address space A (226A) and application virtual address space B (226B), and may be mapped to the physical addresses of one or more components of the hardware layer (210). Further, the user space file system virtual address space (250) may be partitioned into segments for each thread (not shown) that is allocated in the thread queue(s) (245). That is, in one or more embodiments of the invention, there is a unique region of the user space file system virtual address space (250) that is reserved for each thread maintained in the thread queues. Accordingly, in one or more embodiments of the invention, the partitions of user space file system virtual address space (250) that are unique to each thread do not have virtual addresses that overlap with the other regions of virtual memory. Accordingly, in one or more embodiments of the invention, the user space file system virtual address space (250) may be partitioned and sized appropriately before use, therefore eliminating (or reducing) any need to delete existing mappings to virtual addresses of the user space file system virtual address space (250).

In one or more embodiments of the invention, the user space shared virtual memory (251) is a region of virtual memory that is mapped to physical memory (e.g., 238) of the node. The user space shared virtual memory (251) is mapped to the same region of physical memory as the kernel shared virtual memory (252) (discussed below). The user space file system (228) and file system kernel module (231) may communicate via (e.g., by writing data to and reading data from) the same physical mapped to their respective virtual memories (251, 252). In one or more embodiments of the invention, the physical memory region mapped to the user space shared virtual memory (251) may be 'fixed' such that the user space file system (228) may easily maintain the mapping. Further, in one or more embodiments of the invention, the user space shared virtual memory (251) is partitioned into regions that are uniquely associated with each thread in thread queue(s) (245). Accordingly, in one or more embodiments of the invention, the partitions of user space shared virtual memory (251) that are unique to each thread do not have virtual addresses that overlap with the other regions of the user space shared virtual memory (251).

In one or more embodiments of the invention, an operating system (e.g., operating system (208)) is software executing on the node (200). In one embodiment of the invention, an operating system (208) coordinates operations between software executing in user space (202A, 202B, 228) and one or more components of the hardware layer (210) to facilitate the proper use of the components of the hardware layer (210). In one or more embodiments of the invention, the operating system (208) includes a software (e.g., 230, 231). In one embodiment of the invention, the operating system (208) may be executing software that monitors data traversing the operating system (208) (e.g., interactions between user space software (202A, 202B, 228) and hardware layer (210) components) and may intercept, modify, and/or otherwise alter that data based on one or more conditions specified by the software executing in user space (202A, 202B, 228). Specifically, an operating system may include a file system handler (e.g., file system handler (230)) and a file system kernel module (230). Each of these components is described below.

In one or more embodiments of the invention, the file system handler (230) is software executing in the OS (208) that receives file requests from applications executing in user space (e.g., application A (202A), application B (202B)). The file system handler (230) may be configured to receive file requests (e.g., open, read, write, etc.) and identify which file system relates to the requested data. In one or more embodiments of the invention, if file request is for a file managed by the user space file system (228), the file system handler (230) will forward that file request to the file system kernel module (231).

In one embodiment of the invention, the file system kernel module (231) is software executing in the OS (208) that receives file requests from the file system handler (230) for file managed by the user space file system (228). The file system kernel module (231) may include a process coordinator (232), one or more CPU socket queue(s) (245), and kernel shared virtual memory (252). Each of these components is described below.

In one or more embodiments of the invention, the process coordinator (232) is software executing within the file system kernel module (231), that may include instructions which, when executed, initiate operations of one or more components in the hardware layer (discussed above). In one or more embodiments of the invention, the process coordinator (232) includes functionality for managing processes performed by the processors of the node. The process coordinator may obtain requests from a component in the system to read and/or write data associated with the user space file system (228). The process coordinator (232) may analyze the request and identify a processor (234) core that is to operate on (e.g., process) the request using thread queue(s) (245).

In one or more embodiments of the invention, the thread queue(s) (245) are a data structure that includes an order (e.g., ranked, prioritized) list of thread handles (not shown) that are assigned to a core of processor(s) (234). Additional details regarding thread queues (245) may be found in the description of FIGS. 4A, 4B, and 5.

In one or more embodiments of the invention, the kernel shared virtual memory (252) is a region of virtual memory that is mapped to physical memory (e.g., 238) of the node. Like user space shared virtual memory (251), kernel shared virtual memory (252) is mapped to the same region of physical memory as the user space shared virtual memory (251). As discussed above, the user space file system (228) and file system kernel module (231) may communicate via (e.g., by writing data to and reading data from) the same physical mapped to their respective virtual memories (251, 252). In one or more embodiments of the invention, the physical memory region mapped to the kernel shared virtual memory (252) may be 'fixed' such that the file system kernel module (231) may easily maintain the mapping. Further, in one or more embodiments of the invention, the kernel shared virtual memory (252) is partitioned into regions that are uniquely associated with each thread in thread queue(s) (245). Accordingly, in one or more embodiments of the invention, the partitions of kernel shared virtual memory (252) that are unique to each thread do not have virtual addresses that overlap with the other regions of the kernel shared virtual memory (252).

In one or more embodiments of the invention, the hardware layer (210) is a collection of physical components configured to perform the operations of the node (200) and/or otherwise execute the software of the node (200), applications (202A, 202B, 228). In one embodiment of the invention, the hardware layer (210) may include one or more communication interface(s) (233), one or more processor(s) (234), persistent storage (236), memory (238), and a memory management unit (MMU) (240). Each of these components is described below.

In one embodiment of the invention, a communication interface (233) is a hardware component that provides capabilities to interface the node (200) with one or more devices (e.g., a client, another node, a network of devices) and allow for the transmission and receipt of data with those device(s). A communication interface (233) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, a processor (234) (i.e., central processing unit (CPU)) may be an integrated circuit for processing instructions (e.g., applications (202A, 202B, 228) and/or those received via a communication interface (233)). In one embodiment of the invention, processor(s) (234) may be one or more processor cores or processor micro-cores. Further, in one or more embodiments of the invention, one or more processor(s) (234) may include cache (as described in FIG. 3 below).

In one embodiment of the invention, persistent storage (236) may be one or more hardware devices capable of storing digital information (e.g., data) in a non-transitory medium. Further, in one embodiment of the invention, when accessing persistent storage (236), other components of node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.).

In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (202A, 202B, 228)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory devices (238).

Examples of memory (238) devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

In one or more embodiments of the invention, an MMU (240) is hardware configured to translate virtual addresses (e.g., those of a virtual address space (226A, 226B, 250)) to physical addresses (e.g., those of memory (238)). In one embodiment of the invention, an MMU (240) is operatively connected to memory (238) and is the sole path to access any memory device (e.g., memory (238)) as all commands and data destined for memory (238) must first traverse the MMU (240) prior to accessing memory (238). In one or more embodiments of the invention, an MMU (240) may be configured to handle memory protection (allowing only certain applications to access memory) and provide cache control and bus arbitration. Further, in one or more embodiments of the invention, an MMU (240) may include a translation lookaside buffer.

While FIG. 2 shows a specific configuration of a node, other configurations may be used without departing from the scope of the disclosure. Accordingly, embodiments disclosed herein should not be limited to the configuration of devices and/or components shown in FIG. 2.

Figure 3:
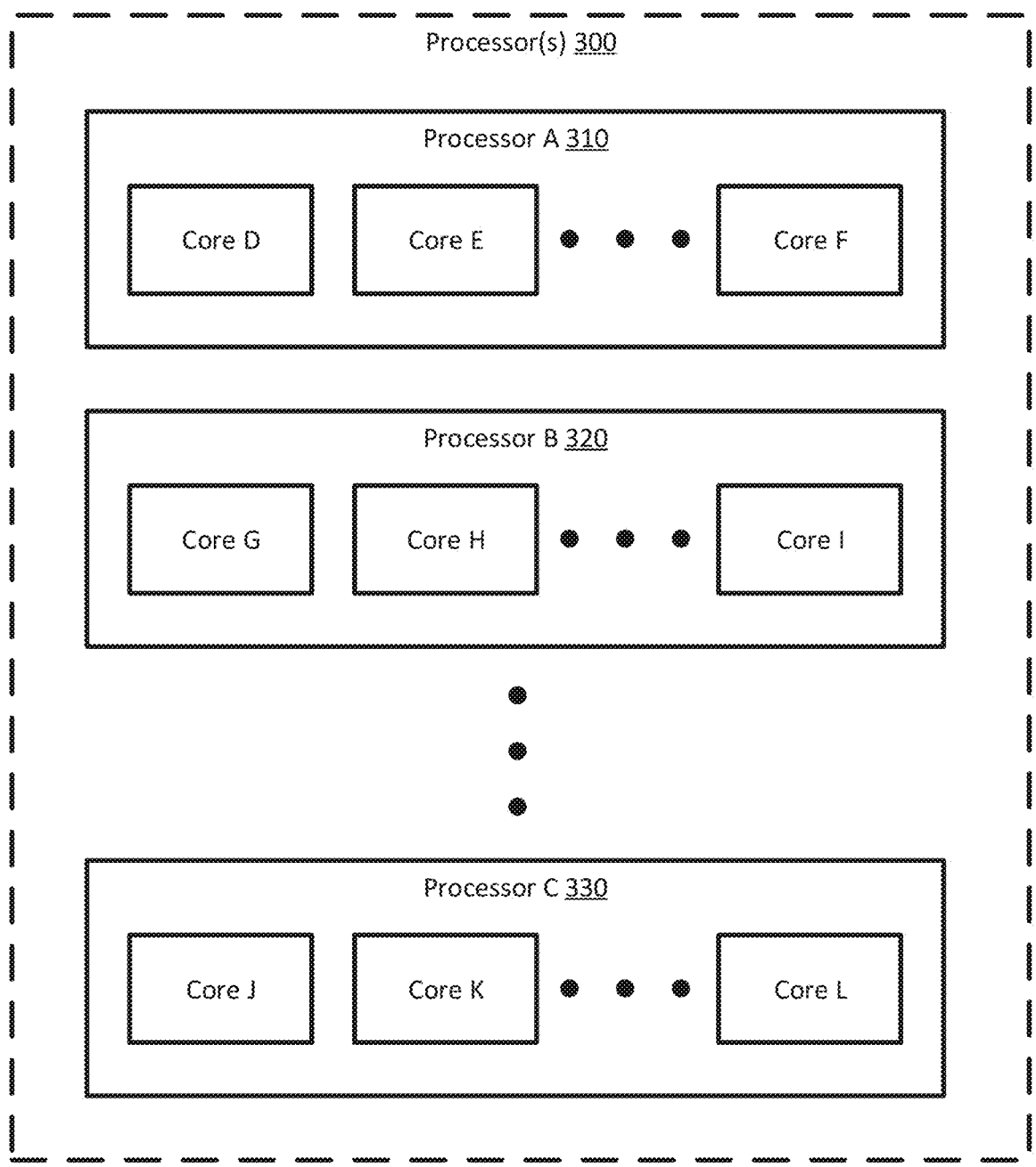
FIG. 3 shows a diagram of one or more processors, in accordance with one or more embodiments of the invention.

FIG. 3 shows a diagram of one or more processors in accordance with one or more embodiments of the invention. The processors (300) may be processors of the hardware layer (discussed in FIG. 2). Each processor (310, 320, 330) may be an integrated circuit for processing instructions of components in the node (e.g., 200, FIG. 2; 300, FIG. 3) discussed above. Each processor (310, 320, 330) may include one or more cores. Each processor may include additional, fewer, and/or different components without departing from the invention.

In one or more embodiments of the invention, each core includes functionality for processing instructions. Multiple cores in the processors (300) may each process an instruction(s) in parallel to other cores in the same processor and/or parallel to other cores in other processors. For example, core D of processor A (310) may execute an instruction in parallel to—and independent from—core E of processor A (310) and in parallel to and independent from core G in processor B (320), each of which may also be concurrently executing instructions.

Figure 4A:
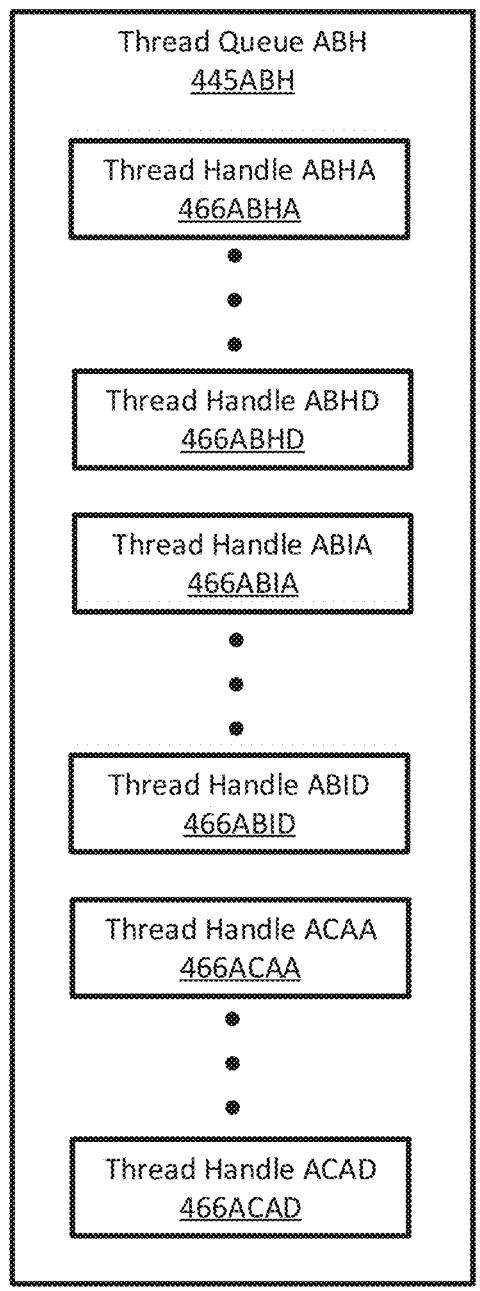
FIG. 4A and FIG. 4B show examples of thread queues, in accordance with one or more embodiments of the invention.
Figure 4B:
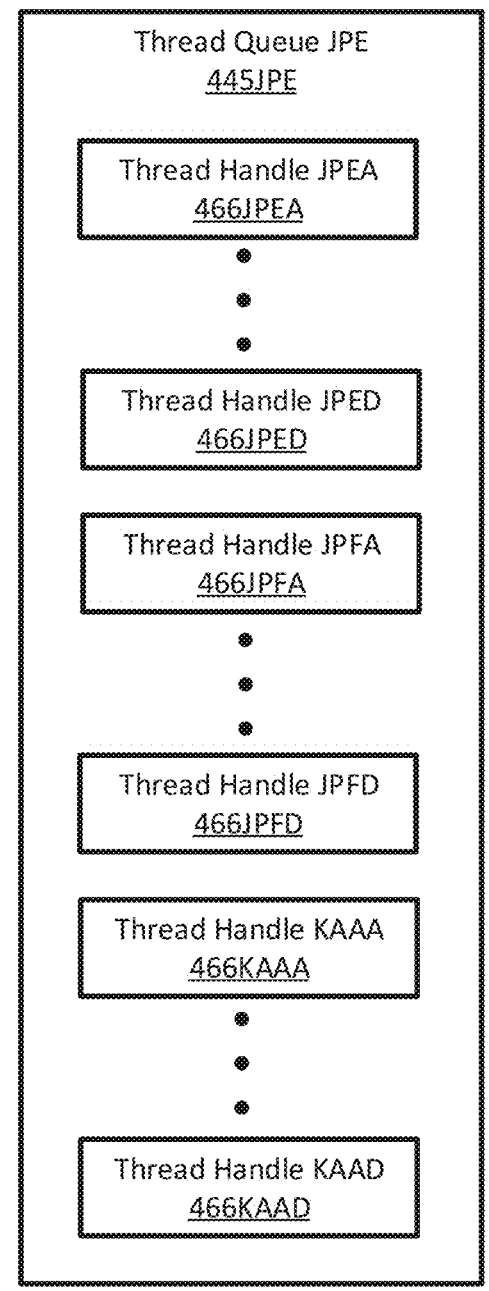

FIG. 4A and FIG. 4B show examples of thread queues, in accordance with one or more embodiments of the invention. In one or more embodiments of the invention, a thread queue (e.g., thread queue ABH (445ABH), thread queue JPE (445JPE)) is uniquely associated with a unique core of the processors. Further, each thread queue (445ABH, 445JPE), when initially created, includes a comprehensive list of all threads that may be executed on each core (e.g., via thread handles (466)).

In one or more embodiments of the invention, the order of the thread handles (466) may be based on the relative latency of the cores (associated with those threads) compared to the core for which the thread queue (445) was generated. Further, in one or more embodiments of the invention, the order of the threads may be based on the cache locality of the core relative to each other. That is, one or more cores may share the same cache pools within a socket; and accordingly, less processing would be required when executing a thread on a core that can maintain access to the same cache pools as the most desired core. Accordingly, as a non-limiting example, if thread queue ABH (445ABH) is associated with core ABH (not shown), then the first thread handles listed in thread queue ABH (445ABH) are threads that would execute on core ABH itself (i.e., those associated with thread handles ABHA-D (466ABHA-D)). Then, the next group of thread handles ABIA-D (466ABIA-D) would belong to a core that has low latency with core ABH (likely physically proximate and in the same socket). Thread queue ABH (445ABH) would continue to provide all thread handles, in increasing latency order, as associated with further distance cores.

Figure 5A:
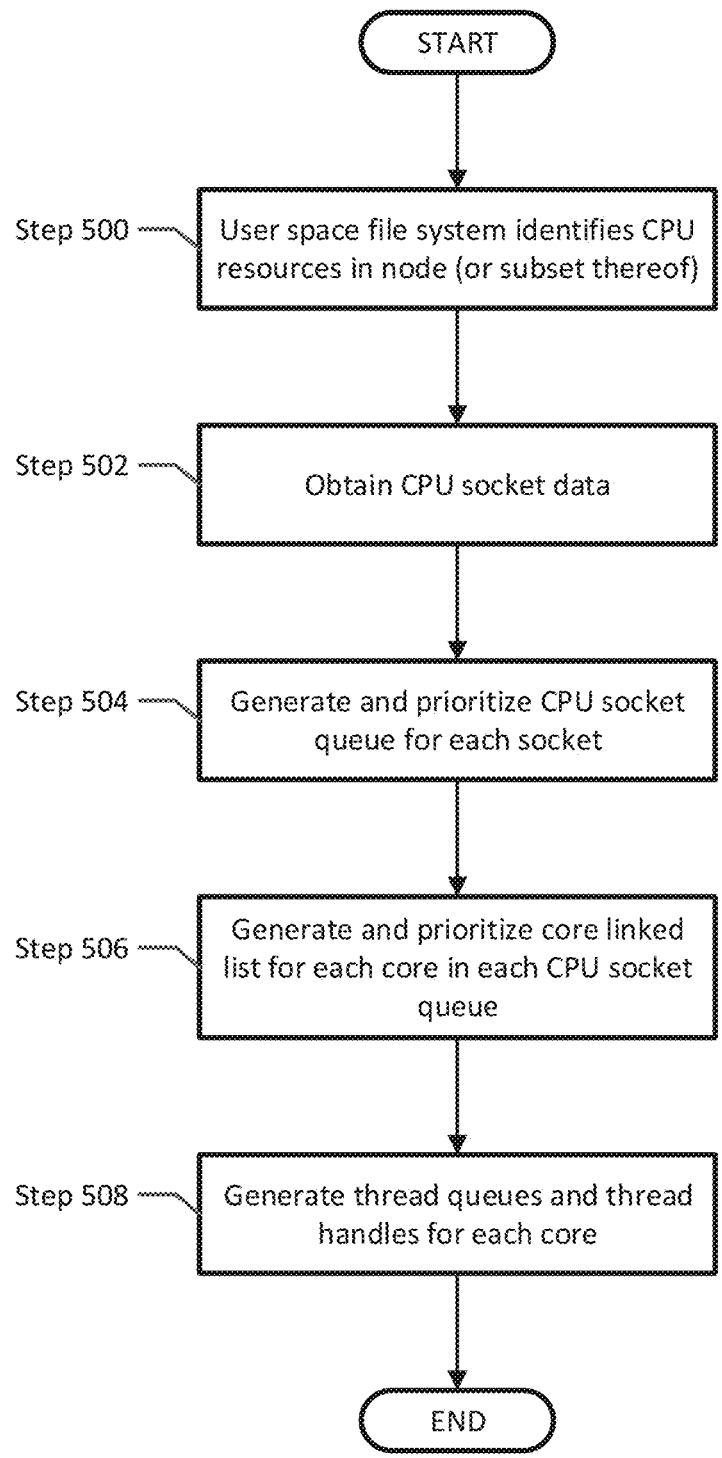
FIG. 5A shows a flowchart for generating a thread queue, in accordance with one or more embodiments of the invention.

Additional details regarding the generation of thread queues is discussed in the description of FIG. 5A.

FIG. 5A shows a flowchart for generating a thread queue, in accordance with one or more embodiments of the invention. All or a portion of the method shown in FIG. 5A may be performed by the user space file system. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, the user space file system identifies the resources of the node upon initial startup. Specifically, in one or more embodiments of the invention, the user space file system identifies the processors, the cores of those processors, and in which sockets those processors reside (if applicable). The user space file system may gather information related to the resources by utilizing one or more operating system components that track and maintain data related to the hardware of the node.

In Step 502, the user space file system obtains data related to the sockets of the processors. Specifically, the user space file system identifies the latency between each socket in relation to every other socket. That is, the latency from one socket may vary depending on the socket from which the latency is measured.

In Step 504, the user space file system prioritizes (e.g., ranks) each socket from lowest latency to greatest latency into a CPU socket queue that is unique to each socket. That is, a CPU socket queue is generated for each socket, where the CPU socket queue begins with itself (the socket for which the CPU socket queue is generated) followed by a different next socket that has the lowest relative latency, and continues until all sockets are ordered by their relative latency.

In Step 506, similar to step 504, the user space file system prioritizes (e.g., ranks) each core—within each socket—from lowest latency to greatest latency into a core queue that is unique to each core. That is, a core queue is generated for each core, where the core queue begins with itself (the core for which the core queue is generated) followed by the next core with the lowest latency respective to that core, until all cores—across all sockets—are listed in a ranked order. Further, as each core belongs to a socket, for which latency ranks have already been determined, the core queue can be organized into one, longer list that provides a relative latency for each core with respect to every other core in the node.

In Step 508, the user space file system generates one or more thread handle(s) (e.g., a virtual thread) to associate with each core (and the respective core queue). Further, in one or more embodiments of the invention, the associated thread handles are organized into thread queues for each core. Thus, for each core, a thread queue is maintained that provides threads for every core in the entire node. Further, the threads are ordered such that the threads at the beginning of the thread queue are assigned to the core for which the thread queue is associated, followed by threads for the core that has the lowest latency with respect to the initial core, followed by threads for every core (in increasing latency order), ending with threads for the core that has the greatest latency with respect to the initial core.

After generating the thread queues, the user space file system may store the thread queues in a location accessible by the file system kernel module (e.g., in a shared memory region) such that the file system kernel module may read and manipulate (e.g., write) to the thread queues. The process may end following step 508.

Figure 5B:
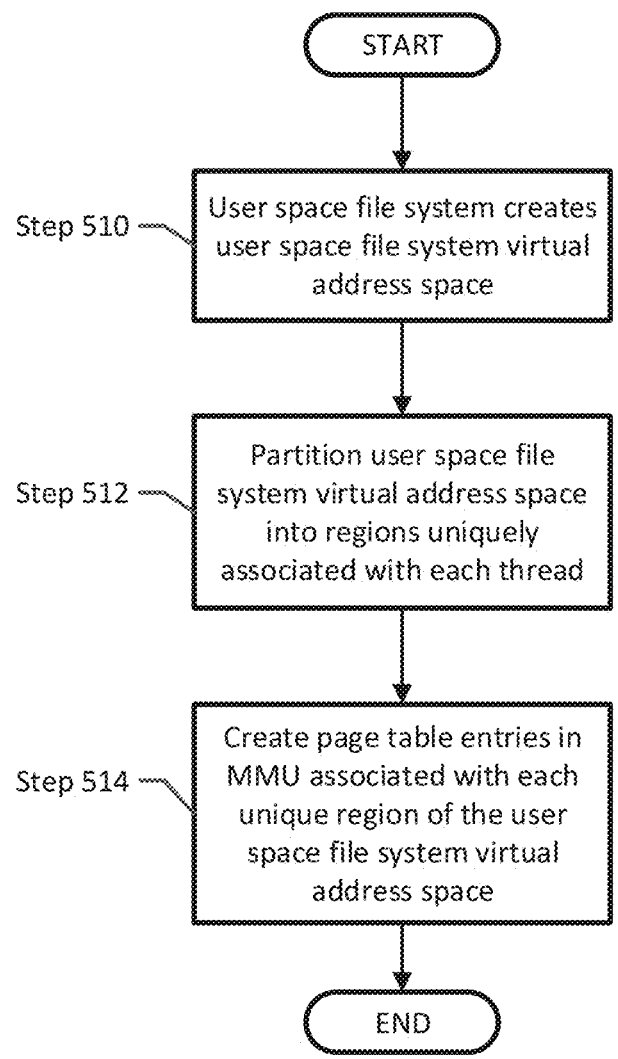
FIG. 5B shows a flowchart for generating user space file system virtual address spaces and page table entries, in accordance with one or more embodiments of the invention.

FIG. 5B shows a flowchart for generating user space file system virtual address spaces and page table entries, in accordance with one or more embodiments of the invention. All or a portion of the method shown in FIG. 5B may be performed by the user space file system. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 510, the user space file system creates a user space file system virtual address space. In one or more embodiments of the invention, the user space file system generates the user space file system virtual address space to be sufficiently large enough to be divisible into smaller partitions (e.g., regions) equal to the sum of threads existing in one or more thread queues. For example, the virtual address range may be generated to be 'sparse', and therefore sufficiently large enough for foreseeable use. Alternatively, knowing the exact number of threads in the node, the user space file system virtual address space may be sized to exactly account for each unique region that will be created (in step 512).

In Step 512, the user space file system partitions the user space file system virtual address space into regions that are uniquely associated with each unique thread created in each thread queue (as discussed in the description of FIG. 4 and FIG. 5A above). Accordingly, each thread in each thread queue is assigned a unique region of the user space file system virtual address space that is only utilized by the operation (e.g., processes) executed on that thread.

In Step 514, the user space file system creates a unique page table entry (in the MMU) that is associated with each unique region of the user space file system virtual address space. Each page table entry in the MMU, when initially generated, may be mapped to an erroneous, incorrect, or otherwise empty physical address. However, when needed for future use (to be remapped to a correct physical memory address), the page table entry will already exist, and may simply be modified to include the current physical address.

Figure 6:
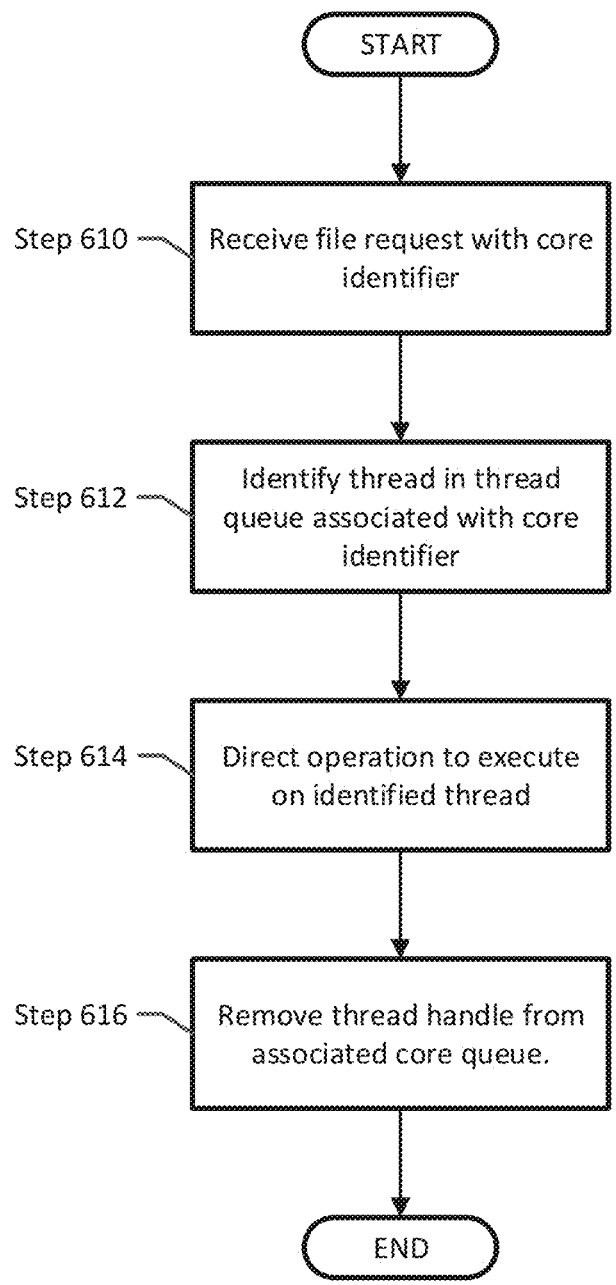
FIG. 6 shows a flowchart for handling a file request, in accordance with one or more embodiments of the invention.

FIG. 6 shows a flowchart for handling a file request, in accordance with one or more embodiments of the invention. All or a portion of the method shown in FIG. 6 may be performed by the process coordinator (of the file system kernel module). Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 610, the process coordinator receives a file request that specifies a core identifier. The file request may be a read request or a write request. The file request may be generated by an application, executing in user space, and sent to the file system kernel module. Further, in one or more embodiments of the invention, the file request may be received from a file system handler, also executing in the operating system, after receiving the file request from the application and forwarding it to the file system kernel module.

In Step 612, the process coordinator identifies the thread queue associated with the core specified by the core identifier. The process coordinator then identifies the first available thread in the thread queue, by the thread handle listed in the thread queue. In one or more embodiments of the invention, identifying the first available thread entails reading the thread queue and selecting the first thread handle that is in the thread queue without respect to any other thread handles that may be present.

In Step 614, the process coordinator directs the file request (and/or one operation associated with the file request) to be executed on the thread associated with the thread handle identified in step 612. In one or more embodiments of the invention, if the file request requires multiple operations to be completed, the process coordinator may repeat steps 612 and 614 until each operation is assigned to a thread associated with that core. The process coordinator may initiate the processing of an operation (of the file request) by waking the thread and issuing the instruction to be performed to the associated core.

In Step 616, the file system kernel module removes the thread handle from the thread queue. In one or more embodiments of the invention, once every thread handle is removed from a thread queue, the user space file system may regenerate the thread queue (as discussed in the description of FIG. 5). The process may end following step 616.

Figure 7:
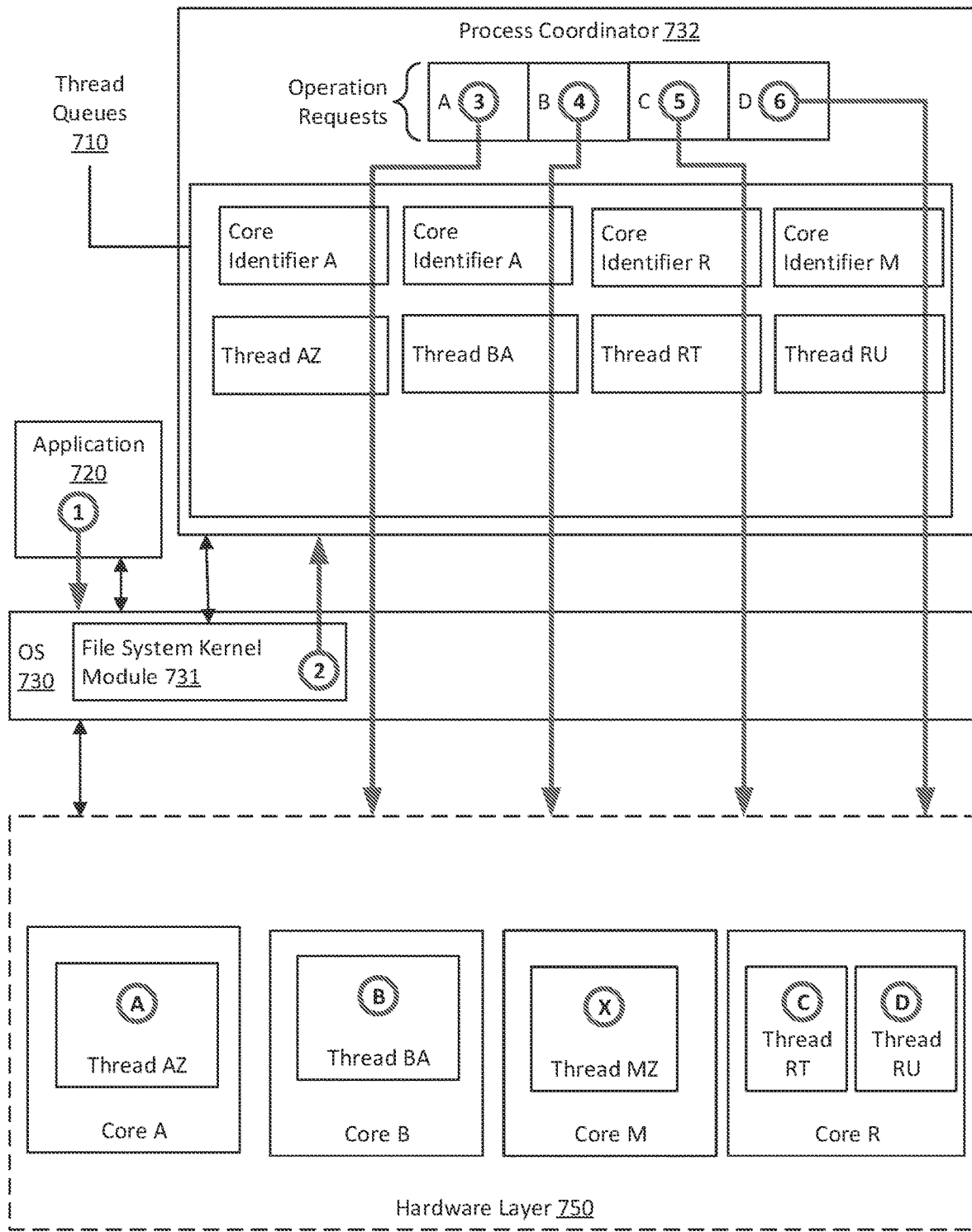
FIG. 7 shows an example, in accordance with one or more embodiments of the invention.

In FIG. 7, consider a scenario in which, at (1), an application sends four file requests and core identifiers to an operating system (OS) (730). Each file request (i.e., file request A, file request B, file request C, file request D) is associated with the user space file system (not shown) and a specific core (via core identifier).

At (2), the file system kernel module (731) operating in the OS (730) receives the file request and, using the core identifier, the process coordinator identifies the thread queue and thread on which to execute each file request.

At (3), the process coordinator (732) reads core identifier A from file request A and selects the next available thread (thread AZ) in the thread queue (710) associated with core A. File request A is then executed on thread AZ of core A.

At (4), the process coordinator (732) reads core identifier A from file request B and selects the next available thread (thread BA) in the thread queue (710) associated with core A. File request B is then executed on thread BA of core B. That is, although file request B is associated with core A, file request A consumed the last available thread on core A (thread AZ), therefore making the next thread (thread BA) in the thread queue for core B.

At (5), the process coordinator (732) reads core identifier R from file request C and selects the next available thread (thread RT) in the thread queue (710) associated with core R. File request C is then executed on thread RT of core R.

At (6), the process coordinator (732) reads core identifier M from file request D and selects the next available thread (thread RU) in the thread queue (710) associated with core M. File request D is then executed on thread RU of core R. That is, although file request D is associated with core M (which is busy executing file request X), the next available thread in the thread queue for core M was thread RU, executing on core R.

Figure 8A:
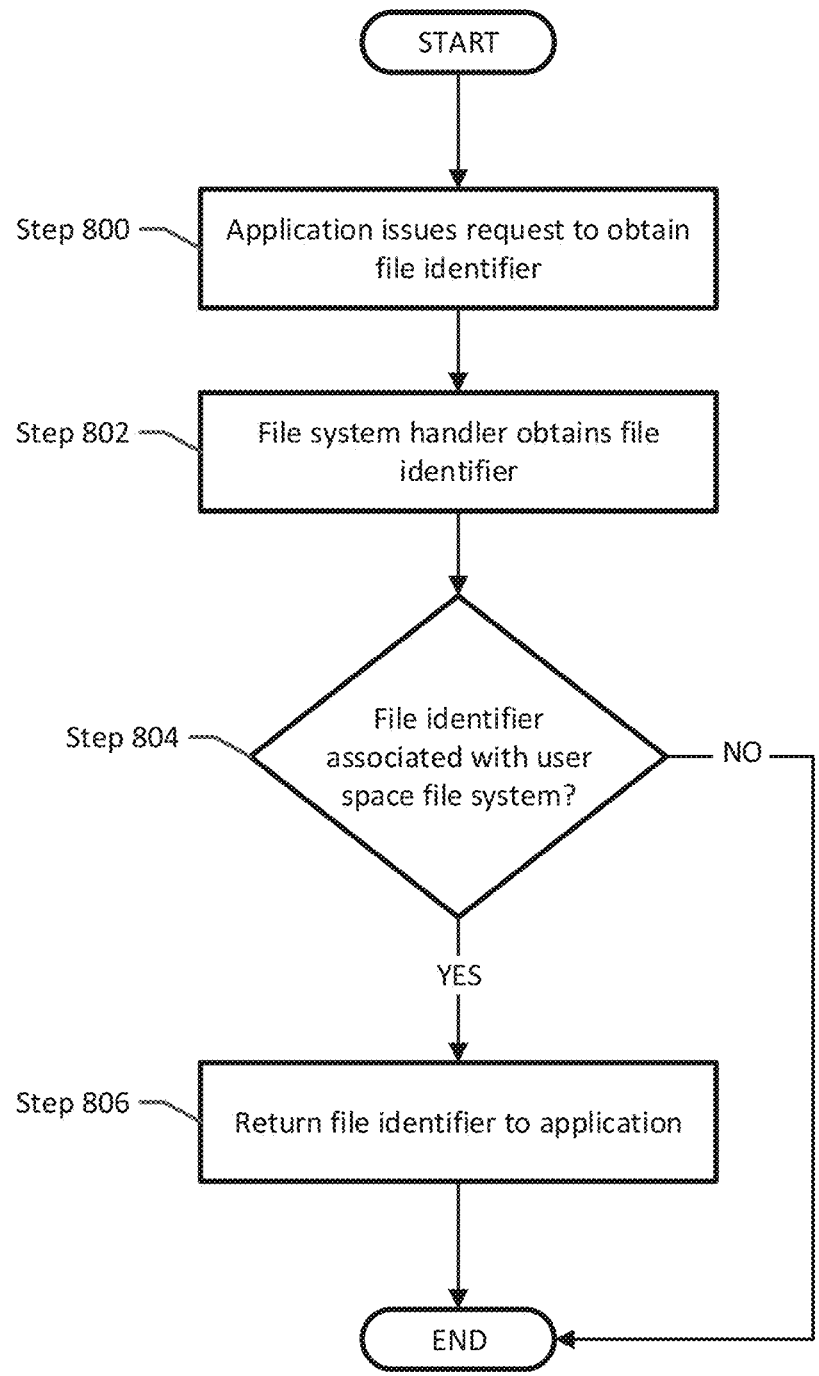
FIG. 8A shows a flowchart for obtaining a file identifier, in accordance with one or more embodiments of the invention.

FIG. 8A shows a flowchart for obtaining a file identifier, in accordance with one or more embodiments of the invention. All or a portion of the method shown in FIG. 8A may be performed by the application and file system handler. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 800, an application issues a request to obtain a file identifier. In one or more embodiments of the invention, the request to open a file identifier may be in the form of an 'open' command that specifies a file by some other form (file name, location, etc.). After generating the request, the application sends the request to obtain a file identifier to the operating system.

In Step 802, the file system handler, executing in the operating system, receives the request to obtain the file identifier from the application. In one or more embodiments of the invention, the file system handler performs a lookup and identifies the file associated with the request and obtains the file identifier.

In Step 804, the file system handler makes a determination if the file identifier is associated with the user space file system. If the file identifier is associated with the user space file system (804—YES), the process proceeds to step 806. However, if the file identifier is not associated with the user space file system (804—NO, e.g., the file identifier is associated with some other file system), the relevant portions of the disclosed process may end.

In Step 806, after the file system handler determines that the file identifier is associated with the user space file system. The file system handler returns the file identifier to the application. In one or more embodiments of the invention, the application then uses the file identifier in future file requests for that file.

Figure 8B:
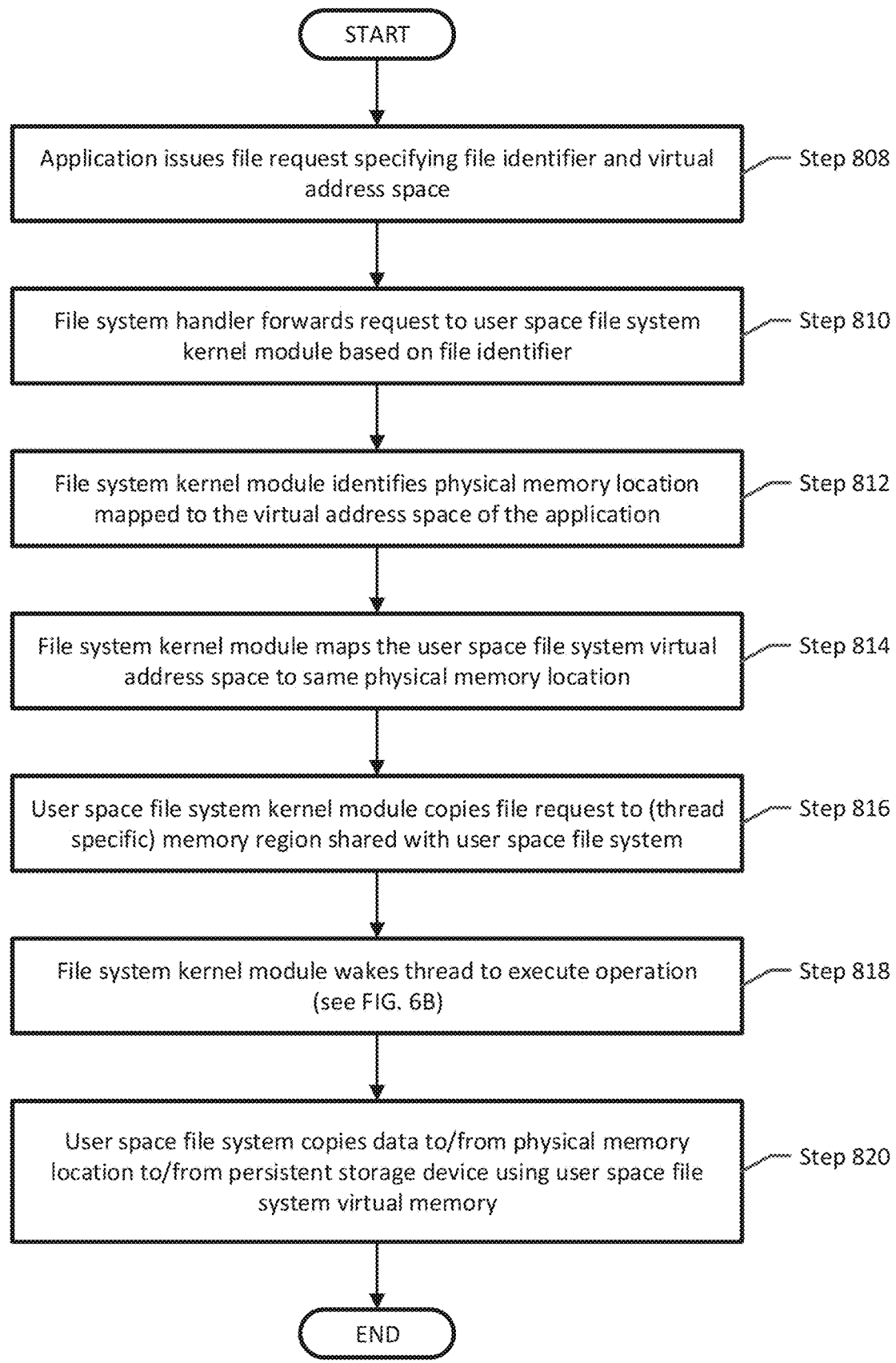
FIG. 8B shows a flowchart for handling a file request, in accordance with one or more embodiments of the invention.

FIG. 8B shows a flowchart for handling a file request, in accordance with one or more embodiments of the invention. All or a portion of the method shown in FIG. 8B may be performed by the application, file system handler, user space file system. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 808, an application issues a file request that includes a file identifier and an application virtual address space (to be mapped to the physical address where the file data resides). In one or more embodiments of the invention, the file request may be a read request or a write request. After generating the file request, the application sends the file request to the operating system.

In Step 810, the file system handler receives the file request. In one or more embodiments of the invention, the file system handler reads the file identifier of the file request, performs a lookup, and determines that the file request is associated with the user space file system (e.g., step 804). After determining the file request is associated with the user space file system, the file system handler forwards the file request to the file system kernel module.

In Step 812, the file system kernel module identifies the physical location in memory mapped to the application virtual address space. Further, the file system kernel module identifies the processor core associated with the file and the thread on which to execute the corresponding operations (FIG. 6B).

In Step 814, the file system kernel module maps the user space file system virtual address space to the same physical memory location as the application virtual address space (as identified in step 812). Accordingly, both the user space file system virtual address space and application virtual address space are mapped to the same locations in physical memory.

In one or more embodiments of the invention, the file system kernel module selects the user space file system virtual address space to be mapped to the same physical memory region. The file system kernel module selects the specific partition (i.e., region) of user space file system virtual address space based on the thread that is executing the command associated with the file request. That is, the file system kernel module identifies the region of virtual address (of the user space file system virtual address space) associated with the thread, and maps those addresses (or some portion thereof) to the physical memory locations (identified in step 812). In one or more embodiments of the invention, the file system kernel module identifies the unique region of the user space file system virtual address space based on its unique and exclusive association with the thread executing the operation of the file request. That is, as discussed in the description of FIG. 5B, the user space file system virtual address space is partitioned into regions that are uniquely and exclusively assigned to individual threads. Accordingly, the file system kernel module is configured to identify that unique region of user space file system virtual address space.

In one or more embodiments of the invention, the file system kernel module maps the user space file system virtual address space to the physical address space by programming the MMU (or sending commands to program the MMU) to include a virtual-to-physical address mapping specifying both addresses. Specifically, the file system kernel module is configured to update the page table entry (created in the MMU in step 514 of FIG. 5B) with the physical memory address (identified in step 812) to the unique region of user space file system virtual address space associated with the thread. Accordingly, there is no need to remove existing page table entries or other data of the translation lookaside buffer (TLB) of the MMU. Instead, the page table entry, uniquely associated with the region of user space file system virtual address space, is updated to include the physical memory address previously identified.

In Step 816, the file system kernel module copies the file request to the kernel shared virtual memory. Specifically, in one or more embodiments of the invention, the file system kernel module copies the file request to a region of kernel shared virtual memory that is unique to the thread selected by the file system kernel module to execute the process.

In one or more embodiments of the invention, as discussed in the description of FIG. 2, the kernel shared virtual memory is mapped the same physical region of memory as the user space file system shared virtual memory. Further, the user space file system shared virtual memory also maintains the same unique regions for each thread. Accordingly, when communicating, the user space file system and file system kernel module can specify the exact thread on which an operation is executing (or is going to execute) by the location on which the request is written in the shared memory.

In Step 818, performs some or all of the process of FIG. 6B and directs the processing of the file request to the specifically identified thread.

In Step 820, the user space file system reads the user space file system shared virtual memory and identifies the file request (added in step 816). The user space file system locates the physical location of the file data in the underlying persistent storage. In one or more embodiments of the invention, in the event that the file request is a read request, the user space file system may directly copy the file data from the physical location in persistent storage to the user space file system virtual address space (which is mapped to the same physical memory locations as the application virtual address space). In one or more embodiments of the invention, where the file request is a write request, the user space file system may directly copy the file data from the user space file system virtual address space (which is mapped to the same physical memory locations as the application virtual address space) to the physical location in persistent storage.

Accordingly, the user space file system may avoid copying the file data to an intermediary storage location (e.g., a "bounce buffer"), but may instead directly copy the file data to system memory and back. Lastly, once the data is written to the physical memory location, the application may alter the data (e.g., write) using its own virtual memory address before committing those changes back to persistent storage.

Figure 9:
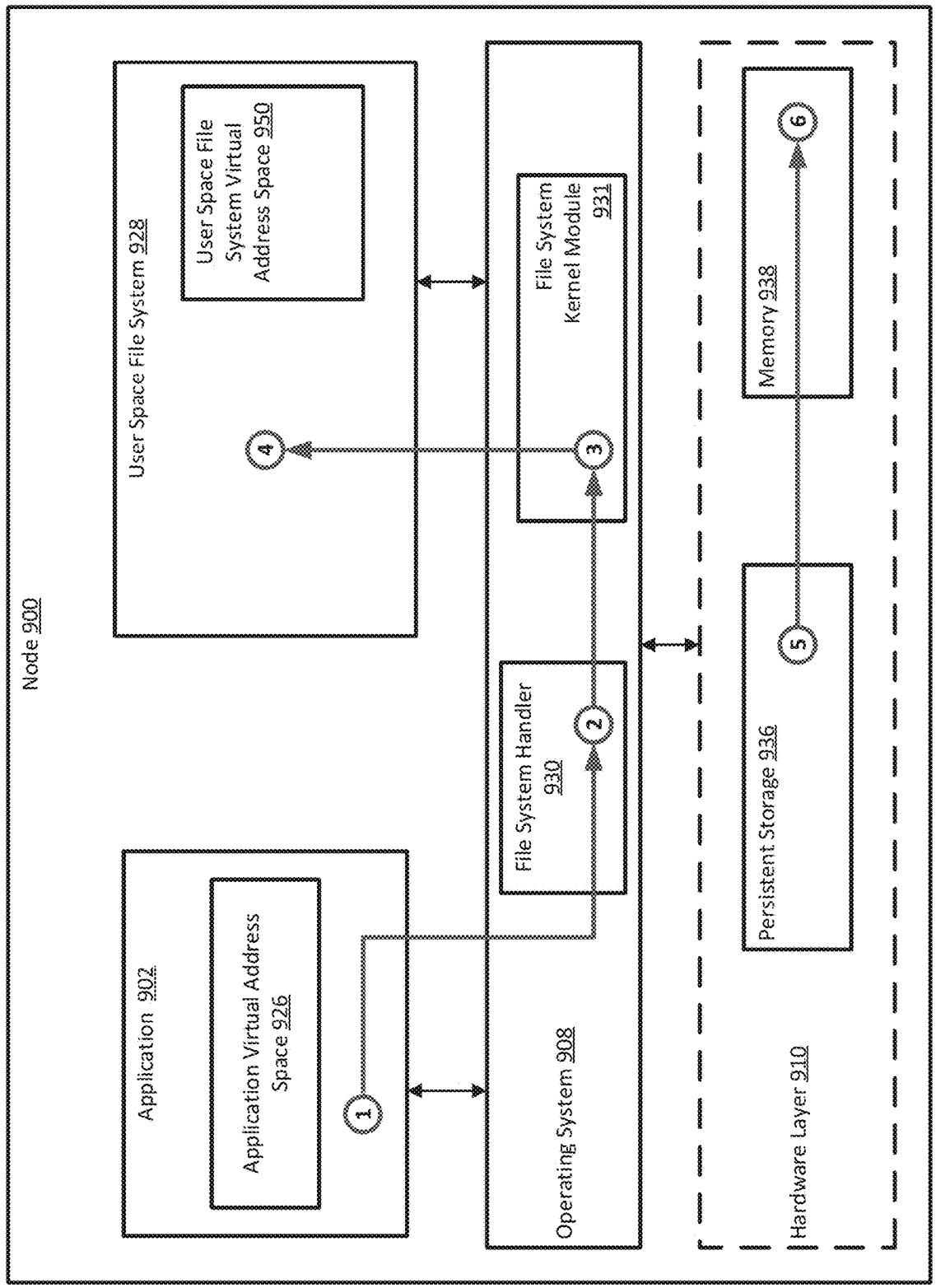
FIG. 9 shows another example, in accordance with one or more embodiments of the invention.

In FIG. 9, consider a scenario in which, at (1), an application (902) issues a read request to the operating system (908) specifying the file identifier and the application virtual address space (926). At, (2) the file system handler (930), executing in the operating system (908) receives the read request. The file system handler (930) uses the file identifier and determines the file belongs to the user space file system (928). Accordingly, the file system handler (93) forwards the read request to the file system kernel module (931).

At (3), file system kernel module (931) identifies the physical location in memory mapped to the application virtual address space (926) of the read request. Further, the file system kernel module (931) identifies the processor core associated with the file and the thread on which to execute the corresponding operations. Further, the file system kernel module (931) maps the unique region of the user space file system virtual address space (950), associated with the thread, to the same physical memory (938) location as the application virtual address space (926). The file system kernel module (931) performs this mapping by updating the page table entry in the MMU that already exists for that specific unique region of the user space file system virtual address space. Once mapped, both the user space file system virtual address space and application virtual address space are mapped to the same locations in physical memory (938). The file system kernel module (931) selects the specific partition (i.e., region) of user space file system virtual address space (950) based on the thread that is executing (or is going to execute) the command associated with the read request. Lastly, the file system kernel module (931) writes the read request to the kernel shared virtual address space (not shown).

At (4), the user space file system (928) reads the user space file system shared virtual memory and identifies the read request. The user space file system locates the physical location of the file data in the underlying persistent storage (936). At (5), the user space file system (928) copies the data from persistent storage (936) to memory (938) using the user space file system virtual address space (950). And, lastly, at (6), the application begins manipulating the file data in memory (938) as accessed by application virtual address space (926) without using an intermediary buffer.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for generating thread queues, comprising:
    obtaining, by a user space file system, central processing unit (CPU) socket data, the CPU socket data comprising: identities of processors, identities of a plurality of cores of the processors, and in which sockets the processors reside; and
    for each core in the plurality of cores:
        generating at least one thread handle to associate with the core;
        maintaining, to associate with the core, a thread queue comprising a plurality of thread handles, the plurality of thread handles comprising the at least one thread handle generated for each core in the plurality of cores; and
        ordering, within the thread queue, the plurality of thread handles based on a latency and a cache locality between the core associated with the thread queue and other cores in the plurality of cores;
    saving the thread queues to a region of shared memory, wherein the region of the shared memory is shared by an application and the user space file system;
    receiving, by a process coordinator, a file request specifying a core identifier corresponding to the core;
    identifying the thread queue associated with the core identifier;
    selecting a first thread handle of the plurality of thread handles ordered within the thread queue; and
    directing the file request to be executed on a thread associated with the first thread handle,
        wherein the file request is subsequently executed on the thread associated with the first thread handle.

2. The method of claim 1, wherein a first subset of the plurality of thread handles comprises the at least one thread handle generated for the core, wherein the first subset of the plurality of thread handles ordered within the thread queue associated with the core is positioned first in the thread queue.

3. The method of claim 2, wherein a second subset of the plurality of thread handles comprises the at least one thread handle generated for a second core in the plurality of cores, wherein the second subset of the plurality of thread handles ordered within the thread queue associated with the core is positioned last in the thread queue, wherein the core has a greater latency with respect to the second core as compared with the other cores in the plurality of cores.

4. The method of claim 1, wherein the method further comprises:
    receiving, by the user space file system, a second file request comprising a file identifier;
    locating file data associated with the file identifier in persistent storage; and
    copying the file data from the persistent storage to a memory region based on a user space file system virtual address space.

5. The method of claim 4, wherein the second file request was generated by the application, wherein the application comprises an application virtual address space mapped to the memory region.

6. The method of claim 4, wherein the second file request was written to a second memory region associated with a second thread handle of the plurality of thread handles ordered within the thread queue associated with the core.

7. The method of claim 6, wherein the second file request is associated with the core.

8. The method of claim 7, wherein the user space file system virtual address space is uniquely associated with a second thread, and wherein copying of the file data comprises updating a page table entry of a memory management unit (MMU), uniquely associated with the user space file system virtual address space, to include the memory region.

9. The method of claim 7, wherein the copying of the file data is processed by a second core in the plurality of cores, wherein the thread queue associated with the core no longer comprises the at least one thread handle generated for the core, wherein a new first thread handle in the thread queue had been generated for the second core.

10. A non-transitory computer readable medium comprising instructions which, when executed by a computer processor, enables the computer processor to perform a method for generating thread queues, comprising:
    obtaining, by a user space file system, central processing unit (CPU) socket data, the CPU socket data comprising: identities of processors, identities of a plurality of cores of the processors, and in which sockets the processors reside; and
    for each core in the plurality of cores:
        generating at least one thread handle to associate with the core;
        maintaining, to associate with the core, a thread queue comprising a plurality of thread handles, the plurality of thread handles comprising the at least one thread handle generated for each core in the plurality of cores; and
        ordering, within the thread queue, the plurality of thread handles based on a latency and a cache locality between the core associated with the thread queue and other cores in the plurality of cores;
    saving the thread queues to a region of shared memory, wherein the region of the shared memory is shared by an application and the user space file system;

receiving, by a process coordinator, a file request specifying a core identifier corresponding to the core;
identifying the thread queue associated with the core identifier;
selecting a first thread handle of the plurality of thread handles ordered within the thread queue; and
directing the file request to be executed on a thread associated with the first thread handle,
wherein the file request is subsequently executed on the thread associated with the first thread handle.

11. The non-transitory computer readable medium of claim 10, wherein a first subset of the plurality of thread handles comprises the at least one thread handle generated for the core, wherein the first subset of the plurality of thread handles ordered within the thread queue associated with the core is positioned first in the thread queue.

12. The non-transitory computer readable medium of claim 11, wherein a second subset of the plurality of thread handles comprises the at least one thread handle generated for a second core in the plurality of cores, wherein the second subset of the plurality of thread handles ordered within the thread queue associated with the core is positioned last in the thread queue, wherein the core has a greater latency with respect to the second core as compared with the other cores in the plurality of cores.

13. The non-transitory computer readable medium of claim 10, wherein the method further comprises:
receiving, by the user space file system, a second file request comprising a file identifier;
locating file data associated with the file identifier in persistent storage; and
copying the file data from the persistent storage to a memory region based on a user space file system virtual address space.

14. The non-transitory computer readable medium of claim 13, wherein the second file request was generated by the application, wherein the application comprises an application virtual address space mapped to the memory region.

15. The non-transitory computer readable medium of claim 13, wherein the second file request was written to a second memory region associated with a second thread handle of the plurality of thread handles ordered within the thread queue associated with the core.

16. The non-transitory computer readable medium of claim 15, wherein the second file request is associated with the core.

17. The non-transitory computer readable medium of claim 16, the user space file system virtual address space is uniquely associated with a second thread, and wherein copying of the file data comprises updating a page table entry of a memory management unit (MMU), uniquely associated with the user space file system virtual address space, to include the memory region.

18. A node, comprising:
user space file system;
an application;
memory;
a plurality of cores; and
a processor, wherein the processor is configured to perform a method for generating thread queues, comprising:
obtaining, by the user space file system, central processing unit (CPU) socket data, the CPU socket data comprising:
identities of processors, identities of a plurality of cores of the processors, and in which sockets the processors reside; and
for each core in the plurality of cores:
generating at least one thread handle to associate with the core;
maintaining, to associate with the core, a thread queue comprising a plurality of thread handles, the plurality of thread handles comprising the at least one thread handle generated for each core in the plurality of cores; and
ordering, within the thread queue, the plurality of thread handles based on a latency and a cache locality between the core associated with the thread queue and other cores in the plurality of cores;
saving the thread queues to a region of the memory,
wherein the region of the memory is shared by the application and the user space file system;
receiving, by a process coordinator, a file request specifying a core identifier corresponding to the core;
identifying the thread queue associated with the core identifier;
selecting a first thread handle of the plurality of thread handles ordered within the thread queue; and
directing the file request to be executed on a thread associated with the first thread handle,
wherein the file request is subsequently executed on the thread associated with the first thread handle.

* * * * *